C. H. WRIGHT.
FIRELESS COOKER.
APPLICATION FILED FEB. 5, 1914.
1,120,877.
Patented Dec. 15, 1914.
2 SHEETS—SHEET 1.
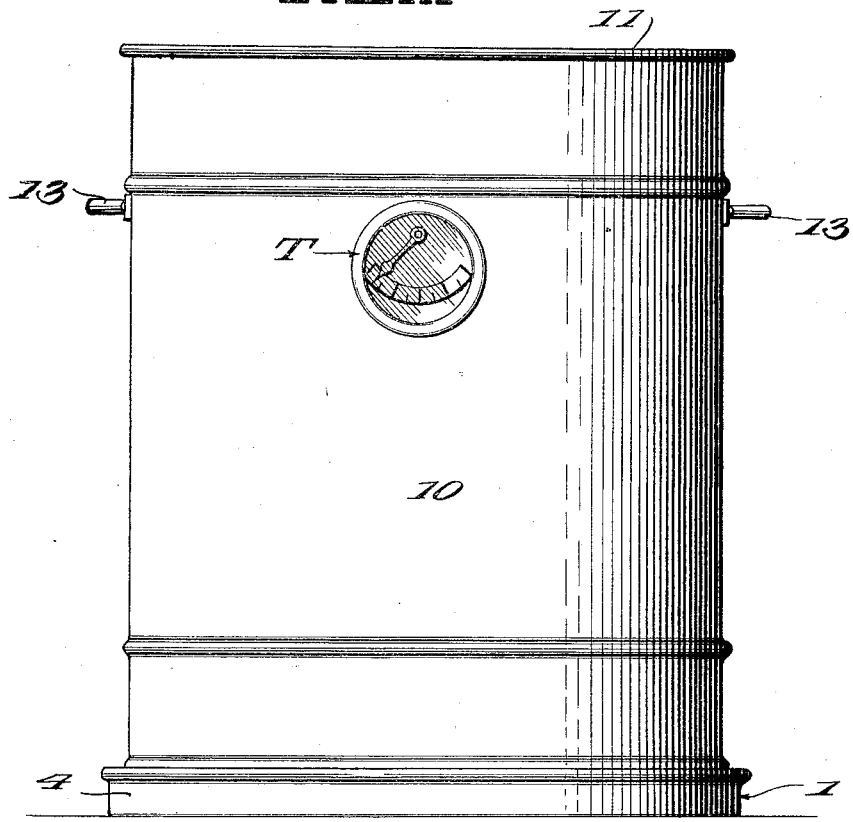
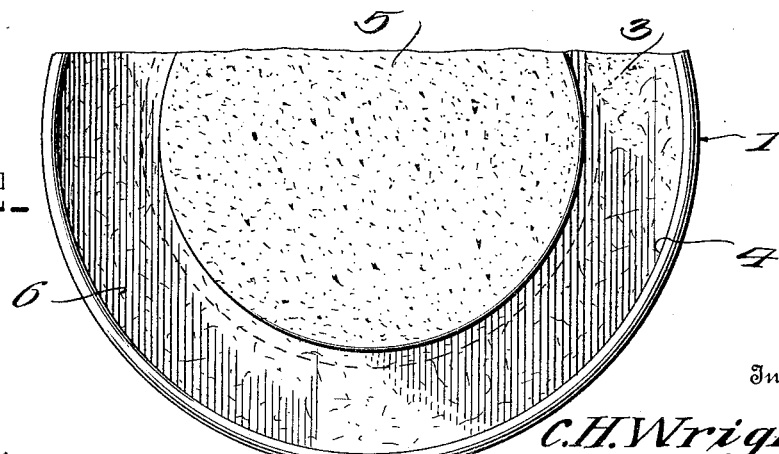

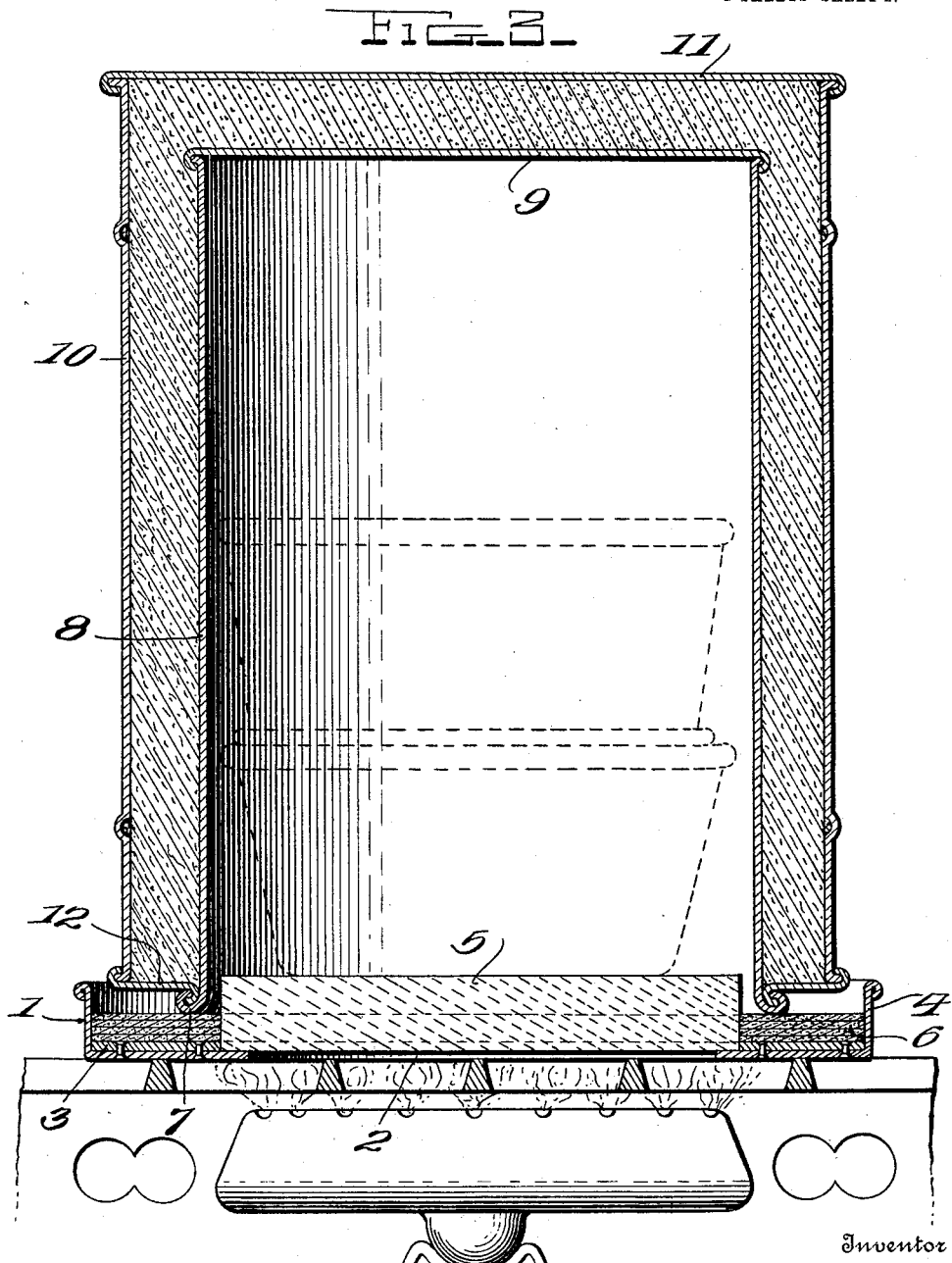

UNITED STATES PATENT OFFICE.

CHARLES H. WRIGHT, OF DENVER, COLORADO.

FIRELESS COOKER.

1,120,877. Specification of Letters Patent. Patented Dec. 15, 1914.

Application filed February 5, 1914. Serial No. 816,775.

*To all whom it may concern:*

Be it known that I, CHARLES H. WRIGHT, a citizen of the United States, residing at Denver, in the county of Denver and State of Colorado, have invented certain new and useful Improvements in Fireless Cookers; and I do declare the following to be a full, clear, and exact description of the invention, such as will enable others skilled in the art to which it appertains to make and use the same.

This invention relates to improvements in fireless cookers and the primary object of the same is to provide a device of this character which is constructed in such a manner as to enable the heating element thereof to be placed over any suitable burner and heated to the proper extent, after which the utensil, containing food to be cooked, may be placed upon said element and a heat insulated hood then placed over said utensil.

A secondary object is to construct the hood, above mentioned, in such a manner that no heat will be allowed to escape from the upper end thereof due to the fact that it is made solid at said upper end.

Still another object of the invention is to construct the device in such a manner that the shell or hood need not be heated to a great extent, heat insulating material being employed between the base on which said shell rests and the lower end thereof.

With the above objects in view, the invention resides in certain novel features of construction and combination herein described and shown in the drawings wherein:—

Figure 1 is a side elevation of my improved fireless cooker; Fig. 2 is a top plan view of a portion of the base thereof; and Fig. 3 is a vertical section through the entire cooker showing it supported upon a stove.

In the embodiment illustrated I have shown my improved fireless cooker as comprising a substantially pan shaped base 1 having its central portion cut away to produce a round opening 2, the remainder of said bottom being reinforced by means of an annular plate 3 which fits rather snugly within the upright wall 4 of the pan and is of less width than said remaining portion of the bottom. By this construction I form a socket in which fits the lower side of a heating element 5 (preferably formed of soapstone).

The heating element 5 is of considerable thickness and is here shown as extending slightly above the wall 4 of said base 1, although it will be clearly understood that this is not necessary to the successful operation of the device.

Disposed between the periphery of the heating element 5 and the wall 4, are a plurality of packing rings 6 which may be formed of any heat insulating material but are preferably formed of asbestos. It will be understood that any number of these rings could be employed or a single ring of greater thickness could be used to equal advantage.

Resting removably upon the uppermost ring 6 is a bead 7 which depends from an inner wall 8 of a heat insulated hood or shell, the wall 8 being provided with a suitable top 9 while an outer wall 10 surrounds the wall 8, is spaced a considerable distance therefrom and is provided with a suitable solid top 11. Any suitable packing such as asbestos may be employed between the walls 8 and 10, and the tops 9 and 11, the obvious reason being to prevent the escape of heat rising from the heating element 5. The packing in the hood is retained by a ring 12 which is secured on its inner edge within the bead 7 while its outer edge is crimped around the outturned edge of the lower end of the wall 10. The shell or hood is preferably provided with a pair of handles 13 by means of which it may be moved and with a suitable thermometer T for determining the temperature within said shell.

With the parts constructed as above described, when the shell or hood is in place over the heating element 5, the inner wall 8 will be spaced from said heating element and the bead 7 will be the only point of contact between said shell and the asbestos rings 6. By so constructing the device, when the element 5 is heated, the heat will radiate therefrom and will cause the base 1 to become very hot. Due to the insulating rings 6 however, very little of this heat will be imparted to the walls of the shell, thus obviating the danger of overheating said shell. It will be understood that the major part of the heat radiated from the element 5 will rise within the shell and will act upon the food placed therein.

By so constructing the above parts, when it is desired to use the cooker, the base 1, containing the heating element 5 and the asbestos rings 6, is placed over any suitable burner. The burner is then lighted and the element 5 allowed to be heated to a proper degree after which the utensil containing the food to be cooked, is placed on said element and the shell or hood is positioned over said utensil with its bead 7 resting upon the uppermost insulating ring 6 as hereinbefore described. After this operation, the heat from the burner may be further employed until the thermometer T registers the proper degree of heat whereupon the flame from said burner may be extinguished and the entire cooker may then be left in its original position and need not be moved from the stove since it is of such size that it takes up no more space than an ordinary broiler, kettle, or frying pan.

The structure herein described, has been given very rigid tests and has proved to be one of the most efficient cookers on the market, there being no openings whatever at the top of the cooker to allow heat to escape.

By constructing the parts in the above described manner and allowing the cooker to remain on the stove, I obviate the loss of heat which is usually prevalent with devices of this character since they employ heating elements which are designed to be heated at one place and then moved to the place where the cooker is located.

Although I have described my invention with considerable minuteness, I do not wish to be limited to details other than those amplified in the appended claims.

I preferably but not necessarily form all metal parts of the device of aluminum, the advantageous characteristics of which are generally known.

Having thus described my invention, what I claim as new and desire to protect by Letters-Patent is:

1. A fireless cooker comprising a pan-shaped base having an opening in the center of its bottom, a heating element centrally located in said pan-shaped base and resting upon said bottom, said heating element being spaced at its edges from the wall of said base, a filling of insulating material resting upon the bottom of the pan-shaped base and located between the edges of said heating element and the wall of said base, and a shell open at its lower end and closed at its upper end, said lower end resting upon said filling of insulating material and being out of contact with the heating element and the wall of the base.

2. A fireless cooker comprising a pan-shaped base, a reinforcing ring secured to the bottom of said base adjacent its juncture with the upright wall of said base, said base having a central opening of less diameter than the diameter of the opening in said ring, whereby to provide an exposed flange projecting inwardly from the ring, a heating element resting upon said exposed portion and contacting at its edges with the inner edge of the ring, an insulating ring surrounding the heating element and interposed between the same and the wall of the pan-shaped base, and a shell closed at its upper end and open at its lower end, said lower end surrounding the upper portion of the heating element, resting upon said insulating ring, and being out of contact with the base and said heating element.

In testimony whereof I have hereunto set my hand in presence of two subscribing witnesses.

CHARLES H. WRIGHT.

Witnesses:
JOHN M. RUSHTON,
RICHARD BULLARD.

Copies of this patent may be obtained for five cents each, by addressing the "Commissioner of Patents, Washington, D. C."